United States Patent Office 3,456,955
Patented July 22, 1969

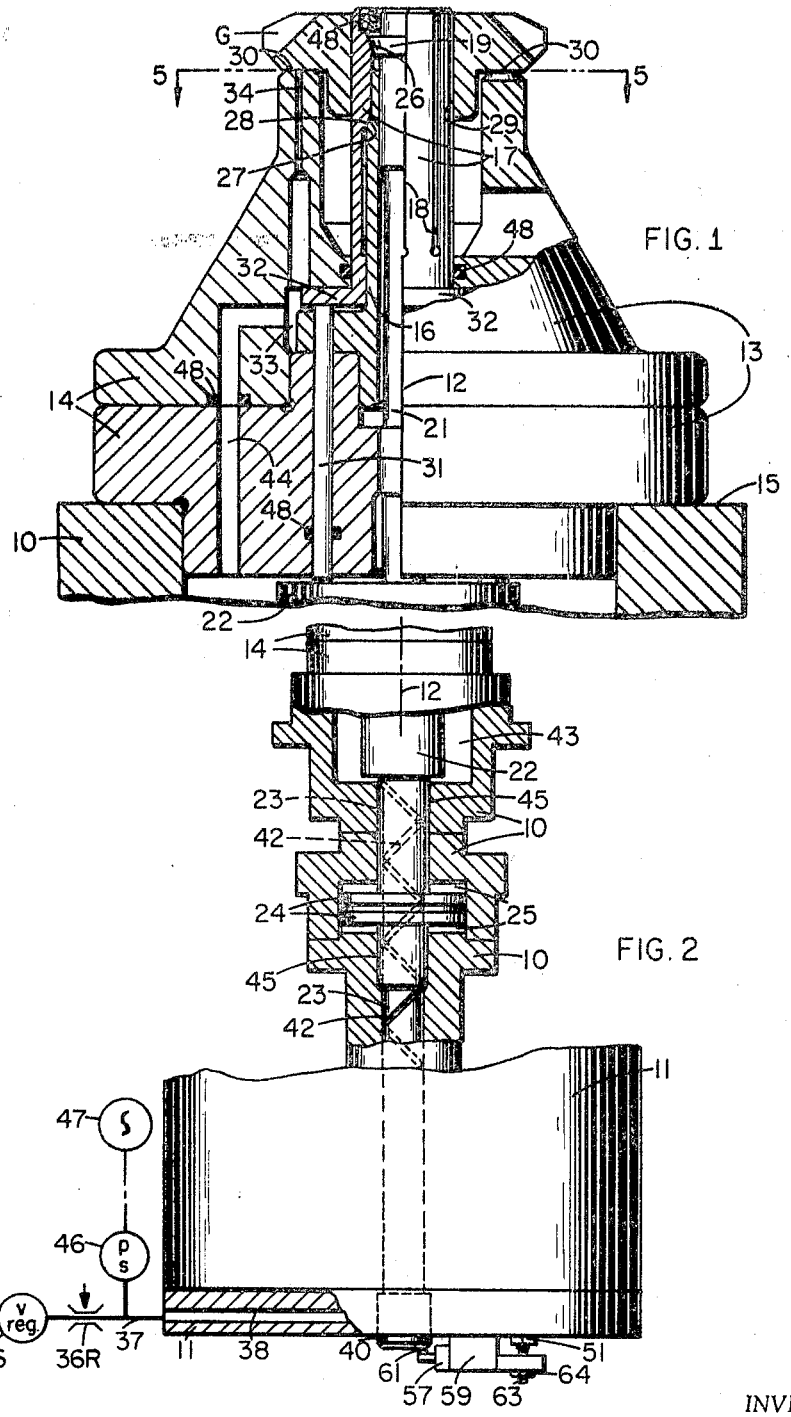

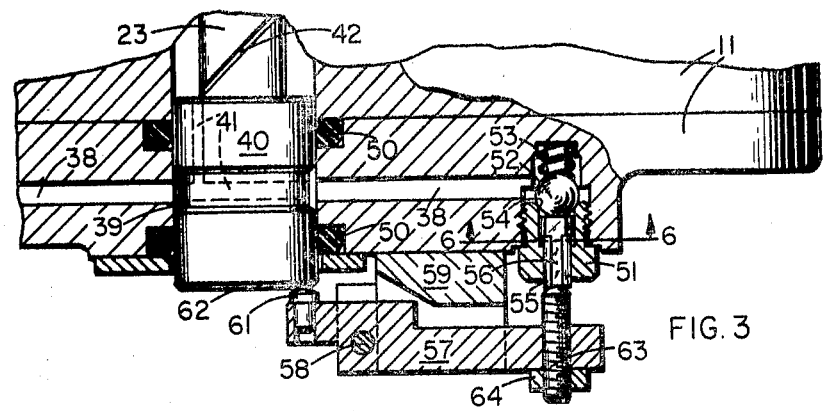
FIG. 3
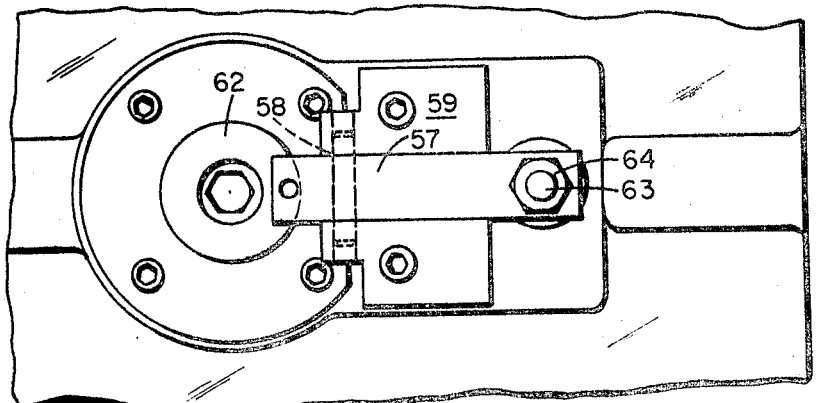
FIG. 4
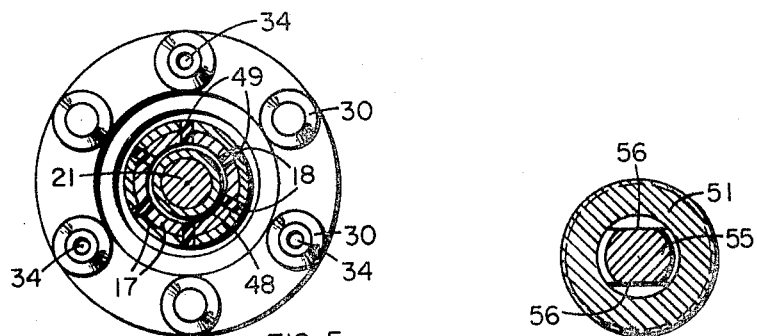
FIG. 5
FIG. 6

3,456,955
WORK SEATING AND CHUCKING DIAMETER CHECKING APPARATUS FOR WORKHOLDERS
Norman G. Bruinsma, Webster, N.Y., assignor to The Gleason Works, Rochester, N.Y., a corporation of New York
Filed Mar. 20, 1967, Ser. No. 624,286
Int. Cl. B23b 31/42, 31/30, 5/22
U.S. Cl. 279—2                                    11 Claims

ABSTRACT OF THE DISCLOSURE

A workholder for a gear cutting machine has a work-seating face and an expansible collet for gripping the bore of the work. A power-actuated draw rod serves to expand the collet and clamp the work against the seating face, the amount of travel of the rod being a measure of the departure of bore diameter from the design value. Air passages open through ports in the work-seating face and also through a poppet valve which is unseated by travel of the draw rod beyond a preselected amount. Air is supplied under controlled pressure to the passages, and switch means responsive to reduction of pressure in the passages, as when the work fails to squarely contact the seating face and thus does not close the ports, or when the travel of the draw rod signifies oversize bore diameter, actuate a signal device and prevent cutting operation of the machine.

---

The present invention relates to apparatus associated with a workholder, for a gear cutting machine or the like, for checking the diameters of the chucking surfaces of workpieces to determine whether they are within the allowable diameter tolerance range and also for checking whether the workpieces are properly seated on the workholder.

In the case of a gear cutting machine, for example, improper seating may result in the gear teeth being cut in incorrect relation to the cylindrical bore and back mounting face of the gear; a chucking surface of a diameter beyond the tolerance range, for example an oversize bore, may result in the gear turning on the workholder when it is subjected to cutting forces, resulting in improperly shaped or spaced teeth and possible damage to the cutter. The object of the invention is to provide a simple and effective means to warn the operator of the machine that a workpiece is improperly seated or that the diameter of a chucking surface is beyond the tolerance range, and, preferably, to prevent operation of the machine until the workpiece has been properly seated or has been replaced.

The invention provides, in combination with a workholder which has a face for seating a workpiece and fluid escape orifices in said face which are closed by a properly seated workpiece, radially displaceable means for gripping a surface of revolution of the workpiece, an actuator for said means movable in the workholder for effecting such radial displacement, a fluid passage extending from a source of fluid pressure and through the workholder to said orifices, and signal means operable in response to reduction of pressure in said passage, the improvement comprising a normally closed exhaust valve for said passage, and means operable by said actuator, upon abnormal motion thereof in the workholder, for opening said valve to thereby reduce pressure in said passage.

A preferred embodiment of the invention is shown in the accompanying drawings, wherein:

FIG. 1 is a view, partly in axial section, through the workholder and a work gear held thereby;

FIG. 2 is a fragmentary view on a smaller scale and also partly in axial section, of a spindle on which the workholder is mounted and a housing in which the spindle is rotatable;

FIG. 3 is a sectional view, on a larger scale, of an end portion of the housing opposite to the end adjacent the workholder;

FIG. 4 is a bottom plan view of the parts shown in FIG. 3;

FIG. 5 is a sectional view of the workholder, in plane 5—5 of FIG. 1, with the work gear removed; and, FIG. 6 is a detail cross-sectional view, in plane 6—6 of FIG. 3.

Referring primarily to FIGS. 1 and 2, the machine to which the invention is applied is a gear cutting machine having a work spindle 10 rotatable about its axis 12 in a housing 11, such rotation being effected by an intermittent indexing mechanism (not shown) in the housing to successively bring into cutting position the several tooth spaces of a work gear G chucked on the spindle. The workholder has a multipart body 13 having a flange 14 seating upon and detachably secured to upper end face 15 of the spindle. Slidable on a projecting hub part 16 of the body is a tubular collet 17 whose upper end has a plurality of slots 18 extending therethrough to enable it to expand radially for gripping the bore of the work gear. Such expansion is effected by a conical expander 19 whose stem 21 is joined by a connector 22 to a rod 23 which is secured to and extends axially through a piston 24 that is reciprocal in a cylinder chamber 25 in the spindle.

The workholder is essentially the same as that disclosed in application Ser. No. 500,770, now Patent No. 3,420,-537, filed by D. M. Walters on Oct. 22, 1965. In operation, after a work gear G has been placed on the collet 17, hydraulic pressure is applied in chamber 25 to the upper face of piston 24 so that the expander 19 is drawn downwardly. By co-action of the conical face of the expander with an internal conical surface 26 of the collet 17, and similar coaction of another internal conical face 27 of the collet with conical face 28 of hub 16, the collet is expanded radially to grip the cylindrical workpiece bore 29 and to draw the workpiece downwardly against work seats 30 (see also FIG. 5) on the workholder body 13. With the work gear thus firmly chucked the tooth cutting operation of the machine takes place, after which the gear is dechucked by releasing the pressure against the upper face of the piston 24, and applying the pressure to the lower face of the piston. This results in upward motion of the expander 19, releasing it from collet surface 26, and, by like upward motion of connector 22, causing the latter to abut and move upwardly rods 31 which are slidable axially in the workholder body. The rods when moved upwardly abut flange 32 of the collet and elevate it sufficiently to disengage conical surfaces 27, 28, allowing the collet to contract to its normal diameter, freeing the work gear for removal from the workholder.

Air-pressure-controlled means are provided to assure the work gears being properly clamped to seats 30 before cutting is begun. For this purpose, after the workpiece has been chucked, air under pressure is introduced into chamber 33 of the workholder body, from which extend passages 34 that open through the centers of alternate seats 30. In the event a work gear is improperly clamped it will fail to close these openings so that air pressure will be lost, and the air-pressure-controlled means will signal this fact to the machine operator, and/or, preferably, act to prevent gear cutting operation of the machine. The air under pressure is introduced from a pressure line 35 through a regulating valve 36 and variable restrictor 36R which supplies air at a selected small volume at a pressure of about thirty p.s.i. to a line 37 communicating with a drilled passage 38 extending through housing 11 to an annular groove 39, FIG. 3, in lower end portion 40 of rod 23. From the groove the compressed air may pass through communicating drilled passages 41 in said end portion 40 and thence through a spiral groove 42 around the rod 23 into the bore 43 in the upper end of the spindle 10, and from this bore through drilled passages 44 in the workholder body 13 into chamber 33. As shown in FIG. 2, the piston 24 has integral upper and lower hubs 45 which surround the rod 23 and isolate the spiral groove 42 from the cylinder chamber 25. An air-pressure-actuated switch 46 connected to line 37 acts upon reduction of pressure (to about 5 p.s.i.) to close a signal circuit which energizes an electric signal lamp 47 and/or, preferably, to open a control circuit of the machine and thereby prevent cutting operation. To prevent unintentional escape of air from the system, the sealing rings designated 48 in FIG. 1 are provided, and the slots 18 are filled with a rubber-like material 49 which is adherent to the collet. Also, sealing rings 50, FIG. 3, are provided around end 40 of rod 23 above and below groove 39.

The present invention enables the same protective system 36, 46, 47, to function when the chucking surface of the workpiece is beyond the tolerance range, i.e. in the illustrated case when the workpiece bore is of such oversize diameter that the collet, expanded as far as is feasible, would be unable to hold the workpiece against movement on the workholder in the presence of cutting forces. For this purpose the drilled passage 38, FIG. 3, is located on the opposite side of annular groove 39 to a bore in housing 11 into which a tubular valve retainer 51 is screw-threaded. A poppet valve comprising a ball 52 is normally held seated by a spring 53 against annular face 54 of the retainer to stop escape of air from the passage 38 through the retainer. The valve may be unseated by upward motion of a valve plunger 55 which is slidable in the retainer. As shown in FIGS. 3 and 6, flats 56 are formed on the sides of the plunger to enable the free passage of air through the retainer when the valve is open. A valve actuating lever 57 is fulcrumed by a pin 58 to a bracket 59 rigidly secured to the housing 11. A hardened steel pin 61 on one end of the lever is adapted for abutment by end face 62 of rod end 40, and a screw 63, threaded through the opposite end of the lever and secured by a lock-nut 64, is adapted to abut the outer face of the plunger 55. The arrangement is such that, with the parts in the position shown in FIG. 3, wherein valve 52 is seated, pin 61 contacts face 62, screw 63 contacts plunger 55, and the latter contacts the valve, any further downward motion of rod end 40 will cause the lever 57 to pivot counterclockwise about fulcrum 58 and the plunger to unseat the valve.

A work gear having an oversize bore will allow greater expansion of the collet and greater downward motion of the expander 19, piston 24 and rod 23, than will a work gear having a bore of design diameter. The screw 63 is so adjusted in the lever that the downward motion of the rod 23 in chucking gears having bores of acceptable diameter will be insufficient to unseat valve 52, but that the greater downward motion of the rod occurring when the workpiece has an oversize bore will result in the valve being unseated. Thus air will escape from passage 38, and the switch 46 will act to energize lamp 47 and/or disable the operating circuit of the machine.

A signal thus given by the lamp 47, or by the failure of the machine to operate, may of course mean either that the bore of the gear is oversize or that the gear is improperly seated. If the latter, the condition is easily remedied by cleaning the work gear and the seats 30, and then rechucking the gear. Should this fail, and inspection reveal no imperfections of the seats 30 or of the back mounting face of the gear which could cause improper seating, it will be concluded that the bore is oversize. Accordingly the gear will be discarded or put aside for special handling.

As shown the lever arm 61–58 is much shorter than the arm 58–63, with the result that only a very slightly excessive down motion of rod 23 will suffice to unseat the valve. This, together with the fact that the valve is of the poppet type, and thus opens abruptly, results in clear cut "go" or "no go" signals being given. This type of valve is preferred over slide valves, for example, which necessarily have sliding clearance and hence open to allow escape of air in a gradual manner, so that it would be possible for a "no go" signal to be given in a case where the bore of the gear is slightly within the bore tolerance limit and where the accuracy of seating of the gear against faces 30 is also slightly within tolerance, but where small leakages of air from one or more of passages 34 and from passage 38 combine to reduce the pressure in line 37 sufficiently to actuate the switch 46.

Having now described the preferred embodiment of my invention, and its mode of operation, what I claim is:

1. In combination with a workholder which has a face for seating a workpiece and fluid escape orifices in said face which are closed by a properly seated workpiece, radially displaceable means for gripping a surface of revolution of the workpiece, an actuator for said means movable in the workholder for effecting such radial displacement, a fluid passage extending from a source of fluid pressure and through the workholder to said orifices, and signal means operable in response to reduction of pressure in said passage, wherein the improvement comprises a normally closed exhaust valve for said passage, and means operable by said actuator, upon abnormal motion thereof in the workholder, for opening said valve to thereby reduce pressure in said passage.

2. The combination of claim 1 wherein said valve is of the poppet type.

3. The combination of claim 2 wherein said valve comprises a spring-closed ball poppet.

4. The combination of claim 1 wherein said actuator is movable axially in the workholder for effecting said radial displacement, and said radially displaceable means is also movable axially in the chuck to draw a workpiece gripped thereby against said face upon such axial movement of the actuator.

5. The combination of claim 1 wherein said radially displaceable means comprises a collet which is radially expansible by the actuator, upon axial movement of the latter in one direction, to grip the bore of the workpiece.

6. The combination of a workholder having a face for seating a workpiece and also having radially displaceable means for gripping a cylindrical surface of a workpiece, and an actuator for said means movable in the chuck for effecting such radial displacement, wherein the improvement comprises a passage extending from a source of fluid pressure, a normally closed exhaust valve for said passage, signal means operable in response to reduction of pressure in said passage, and means operable by said actuator, upon abnormal motion thereof in the workholder, for opening said valve to thereby reduce pressure in said passage.

7. The combination of claim 6 wherein the valve is of the poppet type.

8. The combination of claim 7 wherein said valve comprises a spring-closed ball poppet.

9. The combination of claim 6 wherein said actuator is movable axially in the chuck for effecting said radial displacement, and said radially displaceable means is also movable axially in the chuck to draw a workpiece gripped thereby against said face upon such axial movement of the actuator.

10. The combination of claim 6 wherein said radially displaceable means comprises a collet which is radially expansible by the actuator, upon axial movement of the latter in one direction, to grip the bore of the workpiece.

11. The combination of claim 6 in which there is a lever arranged between the actuator and the valve, the arm of the lever acting against the valve being of greater effective length than the arm of the lever acted against by the actuator, and adjustable means for varying the position of the actuator in which opening of the valve is initiated.

References Cited

UNITED STATES PATENTS

| | | | |
|---|---|---|---|
| 2,420,146 | 5/1947 | Mueller | 279—4 X |
| 2,465,002 | 3/1949 | Aller | 73—37.5 |
| 2,501,130 | 3/1950 | Kuppersmith | 33—178 |
| 3,037,332 | 6/1962 | Wiatt | 51—165 |

ROBERT C. RIORDON, Primary Examiner

J. C. PETERS, Assistant Examiner

U.S. Cl. X.R.

33—179.5; 73—37.5; 279—4